US006922258B2

(12) United States Patent
Pineau (10) Patent No.: US 6,922,258 B2
(45) Date of Patent: Jul. 26, 2005

(54) METHOD AND APPARATUS FOR PRINTING REMOTE IMAGES USING A MOBILE DEVICE AND PRINTER

(75) Inventor: Richard A. Pineau, No. Andover, MA (US)

(73) Assignee: Polaroid Corporation, Waltham, MA (US)

( * ) Notice: Subject to any disclaimer, the term of this patent is extended or adjusted under 35 U.S.C. 154(b) by 616 days.

(21) Appl. No.: 09/870,561

(22) Filed: May 30, 2001

(65) Prior Publication Data

US 2002/0181010 A1 Dec. 5, 2002

(51) Int. Cl.[7] ............................................. G06K 15/00
(52) U.S. Cl. ........................... 358/1.15; 358/1; 455/73
(58) Field of Search ................................ 358/1.15, 401, 358/474, 442, 471, 405; 379/100.01, 100.06; 455/426.2, 73, 553.1; 709/206, 207

(56) References Cited

U.S. PATENT DOCUMENTS

| 6,072,595 | A | 6/2000 | Yoshiura et al. ............. 358/400 |
| 2002/0077974 | A1 * | 6/2002 | Ortiz ........................... 705/39 |
| 2002/0169002 | A1 * | 11/2002 | Imbrie et al. ................ 455/557 |
| 2003/0038963 | A1 * | 2/2003 | Yamaguchi ................ 358/1.15 |

FOREIGN PATENT DOCUMENTS

| EP | 0 830 000 A2 | 7/1997 | ............ H04N/1/00 |
| FR | 2 775 406 | 2/1998 | ............ H04Q/7/32 |
| GB | 2 287 623 | 3/1995 | ............ H04L/12/40 |
| WO | WO 9819478 | 5/1998 | ............ H04Q/7/20 |

OTHER PUBLICATIONS

U.S. Appl. No. 09/870,536, filed May 30, 2001, Pineau.
U.S. Appl. No. 09/870,538, filed May 30, 2001, Prueitt et al.

* cited by examiner

Primary Examiner—Jerome Grant (57) ABSTRACT

Techniques are disclosed for coupling a printer to a mobile communications device (such as a cellular telephone), downloading printing information (such as a digital image) to the printer over a wireless network through the mobile communications device, and using the printer to print output based on the printing information. A user may use the mobile communications device to connect to a printing server that serves the printing information. Prior to transmission of the printing information to the printer, the printing server may process the printing information to tailor the printing information based on the capabilities of the printer. The printing server may communicate with the printer using one or more printing protocols. The printer may be equipped with a controller for communicating according to the printing protocol.

9 Claims, 8 Drawing Sheets

METHOD AND APPARATUS FOR PRINTING REMOTE IMAGES USING A MOBILE DEVICE AND PRINTER

CROSS REFERENCE TO RELATED APPLICATIONS

This application is related to commonly-owned and concurrently filed applications Ser. No. 09/870,536, entitled "Method and System for Remote Utilizing a Mobile Device to Share Data Objects" and Ser. No. 09/870,538, entitled "Method and System for Generating a Permanent Record of a Service Provided to a Mobile Device," each of which is hereby incorporated by reference in their entirety.

BACKGROUND

1. Field of the Invention

The present invention relates to techniques for printing digital images and, more particularly, to techniques for printing remote images using a mobile device and a printer.

2. Related Art

There is an increasing demand for mobile computing devices and for devices with wireless communication capabilities. For example, both cellular telephones and mobile computing devices such as personal digital assistants (PDAs) are becoming increasingly widespread. Furthermore, devices that incorporate both the features of cell phones and of computing devices are becoming increasingly common. For example, cellular telephones are increasingly being equipped with the ability to send and receive email over the Internet and to browse the World Wide Web ("the Web").

Another current trend in the computing industry is the increasing popularity of digital photography, spurred in large part by the advent of low-cost, high-quality digital cameras. An increasing number of web sites allow users to upload digital photographs and other digital images to the Web, where such images may subsequently be viewed, shared, edited, and printed on conventional printers using computers connected to the Web using conventional Internet connections.

As mentioned above, some cell phones—referred to herein as "Internet-enabled cell phones"—are capable of communicating over the Internet. When a user makes a conventional voice telephone call using such a cell phone, the cell phone operates in a first mode (referred to herein as "voice mode"), in which the cell phone places the call over a (typically analog) wireless network designated for voice telephone calls. This network is referred to herein as a "voice network," although such a network may also be capable of carrying data communications. When in voice mode, the display of the cell phone typically displays information such as the telephone number being called, the current duration of the call, and the current strength of the wireless signal.

To connect to the Internet using an Internet-enabled cell phone, the user typically issues a special command to the cell phone (such as by pressing a designated button or selecting a designated menu choice), in response to which the cell phone typically connects to the Internet over a wireless digital network that is designated for data communications. This network is referred to herein as a "data network," and is typically not the same network as the voice network used to place voice calls. While connected to the Internet in this manner, the cell phone typically operates in a second mode, referred to herein as "Internet mode". While the cell phone is in Internet mode, the user may engage in activities such as sending/receiving email and browsing the World Wide Web. The cell phone is typically equipped with special software, such as an email client and web browser (also referred to as a "microbrowser"), for enabling the user to engage in these activities. When in Internet mode, the display of the cell phone typically displays the text of the email currently being sent/received or the contents of the web page currently being viewed. The user uses keys on the cell phone keypad to perform Internet-related functions such as entering text into an email message and navigating through web sites.

Some cellular telephones can also operate in a third mode—referred to herein as "modem mode"—in which they perform functions similar to those of a conventional modem. To operate the cell phone in modem mode, the user typically connects a conventional desktop or laptop computer to a data port on the cellular telephone using a data cable. Using communications software installed on the computer, the user instructs the computer to connect to the Internet. In response, the computer instructs the cell phone to make a call to an Internet Service Provider (ISP) using instructions similar to those used to control a conventional modem. In response to these instructions, the cell phone enters modem mode and calls the desired telephone number over the same voice network that is used to make voice telephone calls. Once an Internet connection is established, the computer may communicate over the voice network through the cell phone as if the cell phone were a conventional modem. While in modem mode, the display of the cell phone is typically blank, since the cell phone is being used as a passive conduit of information which is not in a format suitable for display by the cell phone.

There is currently no standard defining the output of a cell phone's data port while the cell phone is operating in the Internet mode. For example, while the cell phone is operating in Internet mode, the cell phone's data port may not transmit any data, or may not transmit data in a format that can be understood by other devices.

An Internet-enabled cell phone may typically operate in only one of the three modes described above (voice mode, Internet mode, and modem mode) at a time. For example, it is typically not possible for an Internet-enabled cell phone to be connected to the Internet in Internet mode at the same time as the user is using the cell phone to make a voice call in voice mode. Similarly, it is typically not possible for an Internet-enabled cell phone to operate in both Internet mode and modem mode at the same time.

When a user with an Internet-enabled cell phone desires to print a digital image stored on a web site, the user typically must use a conventional desktop or laptop computer to connect to the Internet using the cell phone in modem mode. Once connected, the user uses web browser software on the computer to browse to the web site on which the digital image is stored, downloads the image from the web site, and prints the image using a conventional printer connected to the computer by issuing a "print" command to the web browser or other software executing on the computer. As described above, the display of the cell phone is typically blank during this sequence of events.

Conventional cell phones present the following problem for users who desire to print digital images stored on a web site. Consider a user who has used a cell phone in Internet mode to connect to the Internet. The user has used the cell phone's web browser to identify a digital image on a web site. Using conventional Internet-enabled cell phones, it is typically not possible for the user to print the digital image without first terminating the cell phone's connection to the Internet. The reason for this is that, while connected to the Internet in Internet mode, the cell phone does not support communication with a printer, either directly or through a host computer. Therefore, it is not possible for the cell phone to transmit the desired image to a computer or directly to a printer for printing. As a result, to print an image identified on a web site while browsing the web using a cell phone, the user must typically disconnect the cell phone from the Internet and print the image by connecting to the Internet using the cell phone in modem mode, as described above.

More generally, it is typically not possible for a cell phone to print an image, regardless of the network over which the image is received, directly to a printer. Rather, it is typically necessary to connect the cell phone to a computer that is connected to a printer, and to use the computer to download the image with the cell phone in modem mode and then print the image using the printer.

The need to connect the cell phone to a non-mobile computing device such as a conventional desktop computer in order to print images limits the ability of the user to take fall advantage of the mobility otherwise provided by the cell phone. What is needed, therefore, are improved techniques for downloading and printing digital images using a mobile computing device.

SUMMARY OF THE INVENTION

Techniques are disclosed for coupling a printer to a mobile communications device (such as a cellular telephone), downloading printing information (such as a digital image) to the printer over a wireless network through the mobile communications device, and using the printer to print output based on the printing information.

The printing information may be downloaded to the printer in any of a variety of ways. For example, a user may use the mobile communications device to connect to a printing server that serves the printing information. A connection between the mobile communications device and the printing server may be established in any of a variety of ways, such as by: (1) using the mobile communications device to place a telephone call to the printing server over a wireless voice network, (2) using the mobile communications device as a modem to establish a connection to the printing server over a data network, or (3) using the mobile communications device in an Internet mode to connect to the printing server (or an application server associated with the printing server) over the Internet.

Alternatively, the mobile communications device may establish a connection (of any of the types described above) to a transaction server with which a user of the mobile communications device may conduct a transaction. The transaction may, for example, be a transaction for requesting or purchasing items such as tickets, maps, brochures, coupons, photographs, menus, or schedules. Upon completion of the transaction, the transaction service may communicate with the printing server described above to produce the printing information to be printed (such as a digital image of the purchased item). The printing information may be transmitted to the printer by, for example, the printing server or the transaction service.

Prior to transmission of the printing information to the printer, the printing server may process the printing information to tailor the printing information based on the capabilities of the printer. For example, the printing server may tailor the printing information to comport with the resolution and/or color depth at which the printer is capable of printing. The printer may, for example, transmit information descriptive of its capabilities to the printing server over any of the connections described above at any appropriate time.

The printing server and/or the transaction service may communicate with the printer using one or more printing protocols for communicating over the connections described above. The printer may be equipped with a controller implemented in hardware, software, or any combination thereof for communicating according to the printing protocol through a port on the printer that is coupled to the mobile communications device.

Additional aspects and embodiments of the present invention and advantages thereof will be described in more detail below.

DETAILED DESCRIPTION

Techniques are disclosed for coupling a printer to a mobile communications device (such as a cellular telephone), downloading printing information (such as a digital image) to the printer over a wireless network through the mobile communications device, and using the printer to print output based on the printing information.

The printing information may be downloaded to the printer in any of a variety of ways. For example, a user may use the mobile communications device to connect to a printing server that serves the printing information. A connection between the mobile communications device and the printing server may be established in any of a variety of ways, such as by: (1) using the mobile communications device to place a telephone call to the printing server over a wireless voice network, (2) using the mobile communications device as a modem to establish a connection to the printing server over a data network, or (3) using the mobile communications device in an Internet mode to connect to the printing server (or an application server associated with the printing server) over the Internet.

Alternatively, the mobile communications device may establish a connection (of any of the types described above) to a transaction server with which a user of the mobile communications device may conduct a transaction. The transaction may, for example, be a transaction for requesting or purchasing items such as tickets, maps, brochures, coupons, photographs, menus, or schedules. Upon completion of the transaction, the transaction service may communicate with the printing server described above to produce the printing information to be printed (such as a digital image of the purchased item). The printing information may be transmitted to the printer by, for example, the printing server or the transaction service.

Prior to transmission of the printing information to the printer, the printing server may process the printing information to tailor the printing information based on the capabilities of the printer. For example, the printing server may tailor the printing information to comport with the resolution and/or color depth at which the printer is capable of printing. The printer may, for example, transmit information descriptive of its capabilities to the printing server over any of the connections described above at any appropriate time.

The printing server and/or the transaction service may communicate with the printer using one or more printing protocols for communicating over the connections described above. The printer may be equipped with a controller implemented in hardware, software, or any combination thereof for communicating according to the printing protocol through a port on the printer that is coupled to the mobile communications device.

Various aspects and embodiments of the present invention will now be described in more detail.

In a first aspect of the present invention, techniques are provided for enabling an image to be downloaded over the Internet through a cellular telephone and printed while the cellular telephone is connected to the Internet in Internet mode. The cellular telephone may be connected directly to a printer which prints the downloaded image, without requiring that the cell phone be connected to an intermediate computer (e.g., a desktop or laptop computer) that controls the printer.

In one embodiment of the present invention, techniques are provided for: (1) enabling a user to identify an image over the Internet using a cellular telephone operating in Internet mode (such as by using a web browser executing on the cellular telephone), (2) connecting a printer to the cell phone, (3) transmitting the image to the printer through the cellular telephone without disconnecting the cellular telephone from the Internet, and (4) printing the image using the printer.

Figure 1:
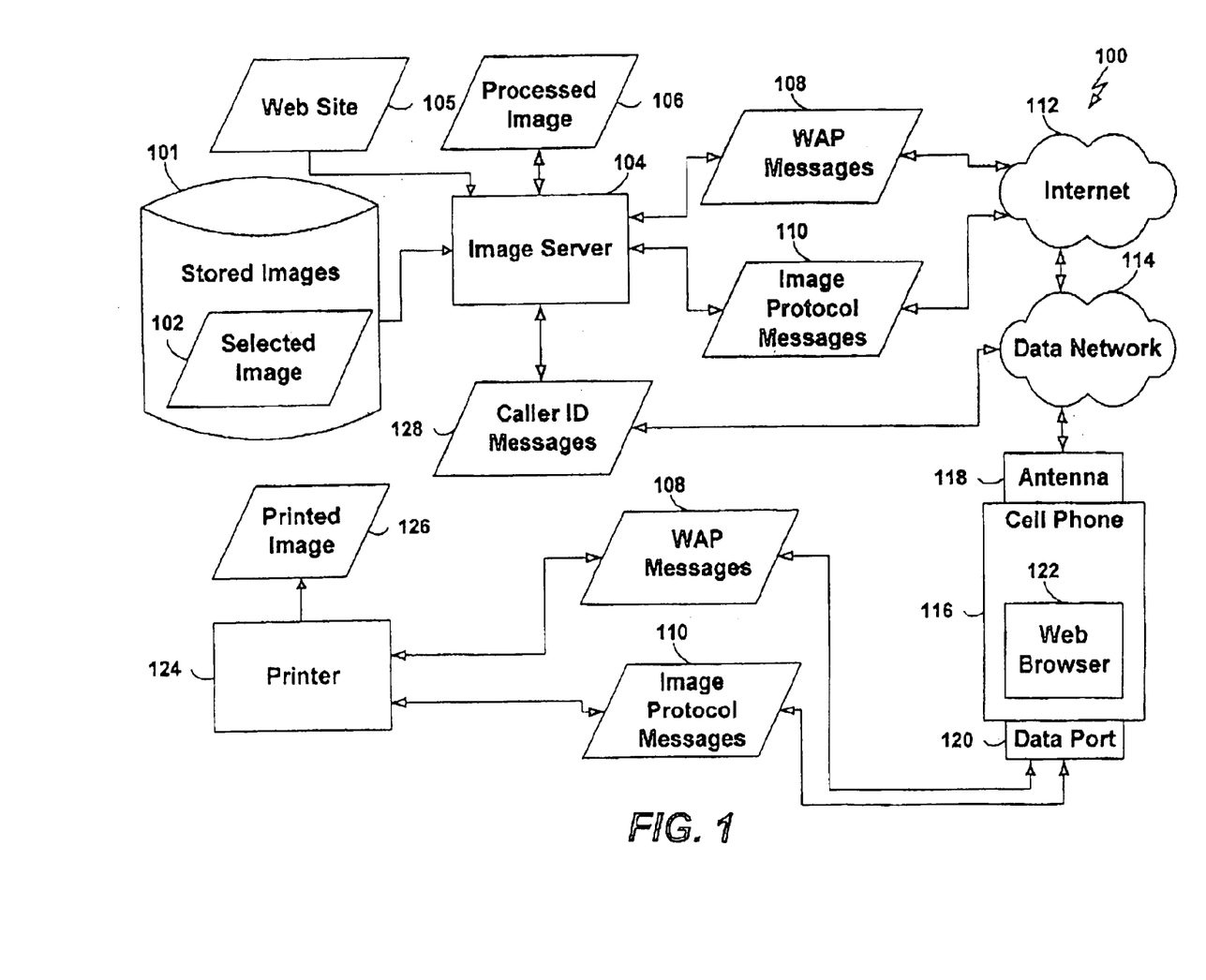
FIG. 1 is a block diagram of a system for downloading and printing an image from a web site using a cellular telephone while the cellular telephone is connected to the Internet in Internet mode according to one embodiment of the present invention.

For example, referring to FIG. 1, a system 100 is shown which may be used in one embodiment of the present invention to download a selected image 102 from an image server 104 to a printer 124 using a cellular telephone 116 operating in Internet mode, without disconnecting the cellular telephone 116 from the Internet 112.

Operation of the system 100 is now described in more detail. The cellular telephone 116 (also referred to herein simply as a cell phone) may be any cell phone that is capable of establishing a connection to the Internet 112. As described above, a user of the cell phone 116 may connect the cell phone 116 to the Internet 112 using features provided by the cell phone 116, such as by pressing a designated button on the cell phone's keypad or by selecting a designated menu choice on the display of the cell phone 116. In response to the user's instruction to connect to the Internet 112, the cell phone 116 enters an Internet mode of operation and establishes a connection to the Internet 112 over a wireless digital data network 114. Antenna 118 of cell phone 116 transmits and receives communications over the data network 114. The data network 114 is typically a network specially designated for carrying wireless data communications, such as Internet communications.

Assuming for purposes of example that the only Internet service provided by the cell phone 116 is access to the World Wide Web, while operating in Internet mode the cell phone 116 executes a web browser 122, shown in FIG. 1 in block diagram form. The web browser 122 is software and/or hardware that enables the user to browse the Web using the cell phone 116. For example, the web browser 122 allows the user to navigate to selected web pages by, for example, selecting hyperlinks to such web pages using the cell phone's keypad and/or touch screen. The web browser 122 displays selected web pages on the display of the cell phone 116 and allows the user to interact with displayed web pages by, for example, entering text using the cell phone's keypad or selecting hyperlinks on such web pages using the cell phone's keypad and/or touch screen.

As shown in FIG. 1, an image server 104 serves a plurality of stored images 101. The image server 104 is accessible over the Internet 112. For example, in one embodiment of the present invention, the image server 104 is a web server that hosts a web site 105 through which stored images 101 may be accessed. In such an embodiment, image server 104 may provide a convenient user interface through which users may upload, download, and view stored images. Examples of techniques for uploading images to such a web server are described in more detail in the co-pending patent application entitled "Method and System for Remote Utilizing a Mobile Device to Share Data Objects."

In another embodiment, a separate application server (not shown) provides the primary content and functionality of web site 105 for uploading, downloading, and viewing stored images 101. The application server may also manage other information such as user profiles and user usage statistics. In such an embodiment, the image server 104 may perform the limited tasks of storing and retrieving stored images 101 as instructed by the application server. As a result, in such an embodiment the combination of the application server and the image server 104 provide a coherent user experience in which the user may upload, download, and view stored images 101.

The functions performed by the image server 104 may be further subdivided into additional servers and/or applications as may be convenient for a particular purpose. It should be appreciated, therefore, that the single image server 104 is described herein as performing all functions related to web site 105 and stored images 101 merely for ease of illustration and explanation.

In one embodiment, the image server 104 is capable of sending and receiving information that is suitable for transmission over the wireless data network 114. Typically, such networks use the Wireless Application Protocol (WAP) for communication. WAP supports a wide variety of wireless networks and operating systems, and is convenient for use with microbrowsers, such as the web browser 122 executing on the cell phone 116. Certain web sites have WAP servers that serve the content of their sites in WAP format, using markup languages such as the compact markup language (c-HTML) and the Wireless markup language (WML), so that it is suitable for transmission to and display by handheld devices. It should be appreciated that although WAP is used herein as an example of a protocol that may be used by the image server 104 and other components shown in FIG. 1, WAP is used merely for purposes of example and is not a limitation of the present invention. Other protocols, including but not limited to the NTT DoCoMo I-mode protocol, may be used.

As shown in FIG. 1, in one embodiment image server 104 and cell phone 116 communicate with each other using messages 108 defined according to WAP and transmitted over the Internet 112 and the data network 114. For example, when a user of the cell phone 116 instructs the web browser 122 to navigate to the web site 105 hosted by the image server, the web browser 122 downloads the web site 105 (or portions thereof) by communicating with the image server 104 using WAP messages 108. Although WAP messages 108 are illustrated near image server 104 in FIG. 1, it should be appreciated that WAP messages 108 may originate from either the image server 104 or the cell phone 116 and are transmitted across the Internet 112 and data network 114.

Figure 2A:
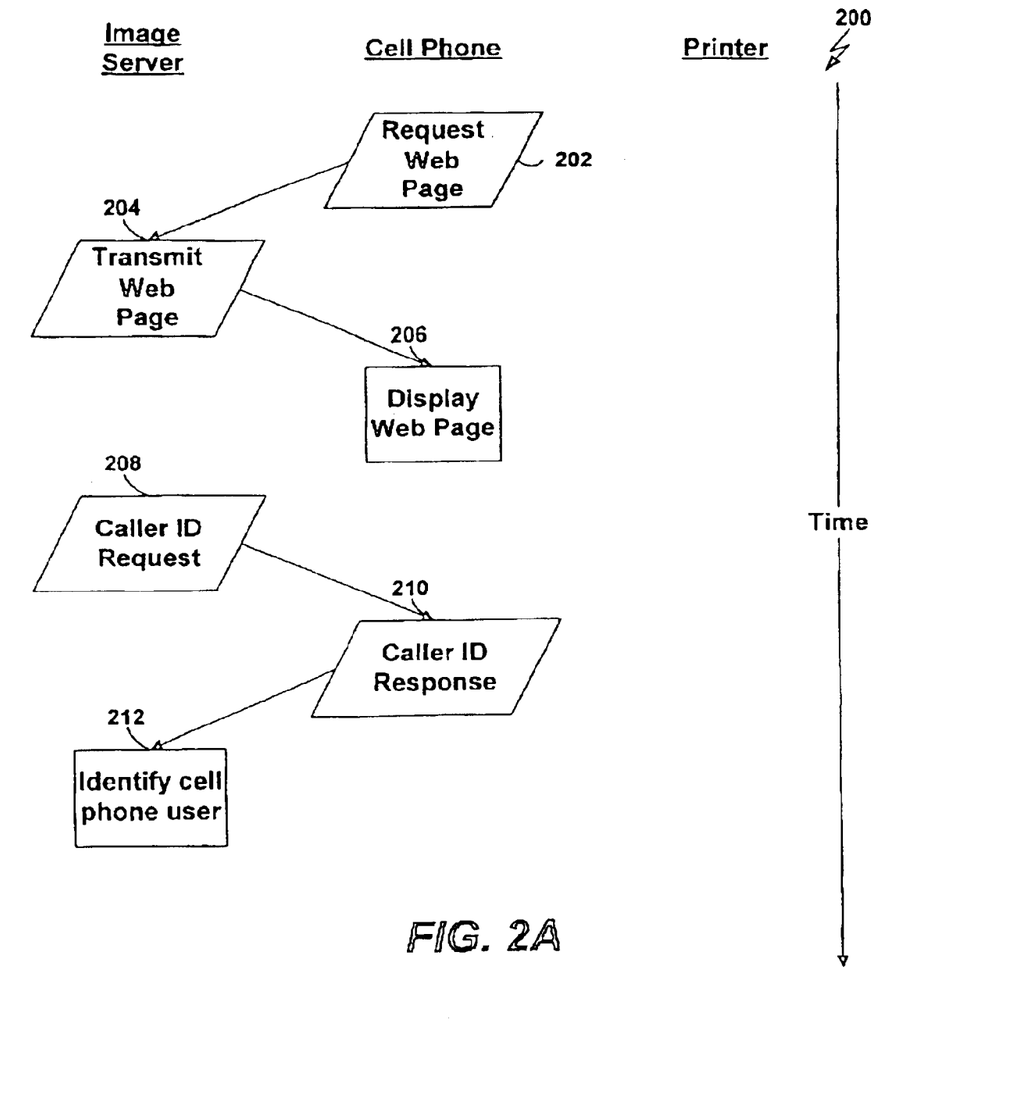
FIGS. 2A–2B are data flow diagrams of a process that is used by the system of FIG. 1 to print an image according to one embodiment of the present invention.
Figure 2B:
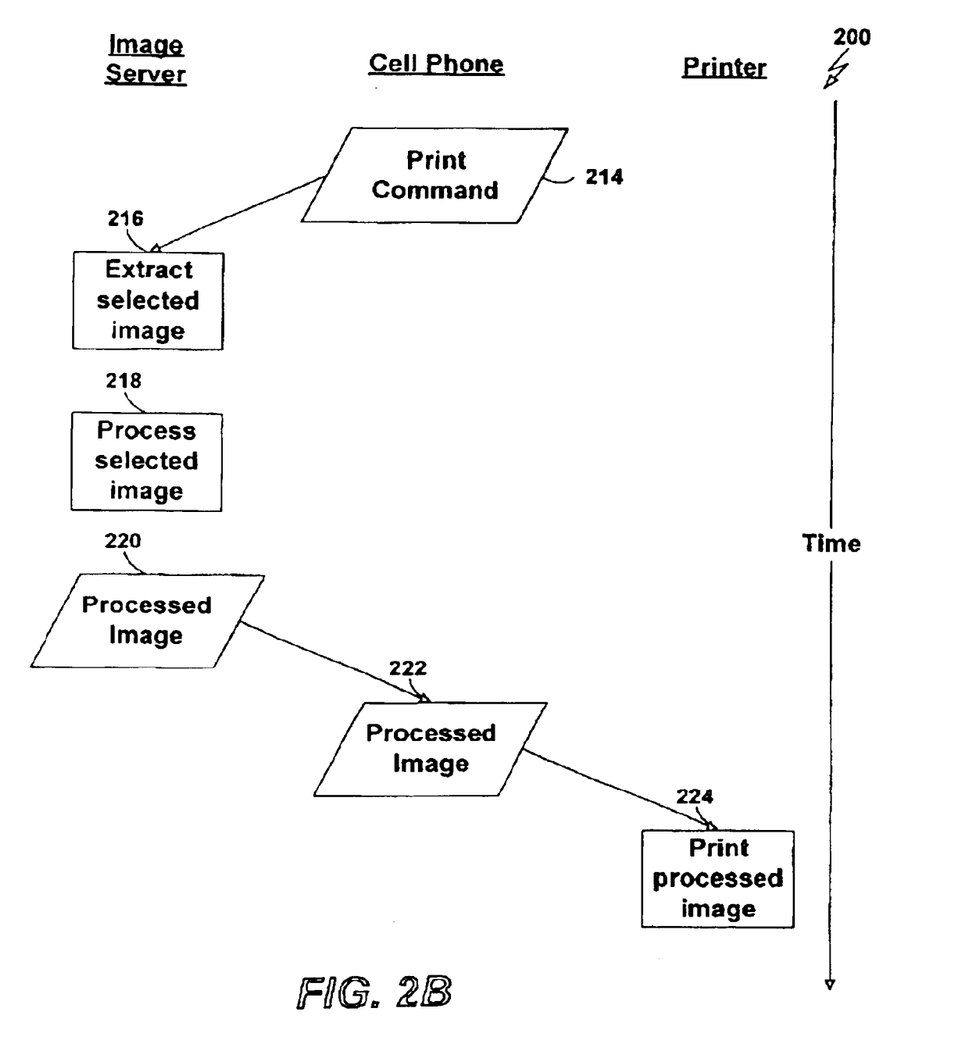

Referring now to data flow diagram 200 of FIG'S. 2A–2B, an example of a method that may be used to download and print an image using the system 100 shown in FIG. 1 is now described. FIGS. 2A–2B illustrate actions performed and messages transmitted by image server 104, cell phone 116, and printer 124. More specifically, diagram 200 includes three columns, corresponding to the image server 104, cell phone 116, and printer 124. An action performed by one of these components is indicated by a rectangle in the corresponding column, and a message transmitted by the component is indicated by a non-rectangular parallelogram in the corresponding column. A message transmitted by a first component to a second component is indicated by a parallelogram describing the message in the first component's column, connected to an arrow ending in the second component's column. Diagram 200 has a time axis which runs downward, indicating the sequence in which actions are performed and messages are transmitted. The description of FIGS. 2A–2B below will further clarify the diagram 200.

The user of cell phone 116 may use the web browser 122 to browse to a web page in web site 105 through which the stored images 101 served by image server 104 may be accessed. The web page may, for example, be a web page having a user interface that simulates a page of a photo album. In particular, web browser 122 sends a WAP message to image server 104 requesting the web page (step 202). In response, image server 104 transmits the requested web page to browser 122 (step 204). Browser 122 displays the web page (step 206).

In one embodiment of the present invention, the cell phone 116 echoes all WAP messages 108 sent and received by the cell phone 116 on the data port 120. As a result, as shown in FIG. 1, WAP messages 108 sent and received by the cell phone 116 are also transmitted to printer 124, which is connected to the data port 120. The printer 124 may therefore monitor WAP messages 108 sent and received by cell phone 116. It should be appreciated, however, that the printer 124 need not be connected to the cell phone 116 prior to receiving the processed image in step 222 (e.g., while the user is browsing the Web and selecting the selected image 102). The cell phone 116 may be a conventional cell phone which echoes WAP messages 108 in this manner, or a cell phone that has been modified to echo WAP messages 108.

In one embodiment of the present invention, when the user browses to the web page hosted by image server 104, image server identifies the cell phone 116 using caller ID messages 128 transmitted over data network 114. The caller ID messages 128 may, for example, identify the telephone number of cell phone 116. For example, referring to FIG. 2A, image server 104 sends a caller ID request to cell phone 116 (step 208), in response to which cell phone 116 sends a caller ID response containing the requested information (step 210). The image server 104 identifies the cell phone user using the caller ID response (step 212).

It should be appreciated, however, that the image server 104 may identify the cell phone 116 using a unique identifier other than the cell phone's telephone number. For example, the cell phone's serial number, permanently stored in the device when the device is manufactured, may also be used by the image server 104 as a unique identifier to identify the cell phone 116.

As described in more detail in the co-pending patent application entitled "Method and System for Remote Utilizing a Mobile Device to Share Data Objects," users may create an account on the web site 115. When a user creates such an account, information about the user, such as the user's login name, password, and cell telephone number (obtained using caller ID), are recorded by the image server 104 in a database. Creation of such an account enables personalization of features provided by web site 105, such as creation of personalized photo albums to which the user's digital photographs may be uploaded.

As a result, when the user browses to the web page (steps 202–206) as described above, and the image server 104 identifies the user's cellular telephone number using caller ID messages 128, the image server 104 may automatically log the user in to the user's account. The image server 104 may then display a personalized web page to the user, such as by displaying the user's personalized photo album to the user. If the user has not previously created an account, or if the user is calling from a different cell phone, the image server 104 may prompt the user to log in by entering the user's login name and password. It should be appreciated that the use of user accounts is described herein merely for purposes of example and does not constitute a limitation of the present invention. Rather, printing and downloading of images may be performed without the creation or use of user accounts.

After browsing to the web page (steps 202–206), the user selects an image 102 for printing. The selected image 102 may be any of the stored images 101. The user may perform such a selection by, for example, touching a thumbnail of the image 102 on a touch screen of the cell phone 116 or hitting a key on the cell phone's keypad corresponding to the selected image 102.

Assuming for purposes of example that the user desires to print the selected image 102, the user issues a "print" command to print the selected image 102. The user may issue such a command by, for example, pressing a designated button on the cell phone's keypad or selecting a "print" menu choice from the web page being displayed. The print command is transmitted to the image server 104 using techniques that are well known to those of ordinary skill in the art (step 214). In response to receipt of the "print" command, the image server 104 extracts the selected image 102 (step 216) and optionally processes the selected image 102 to generate processed image 106 (step 218). Various kinds of processing that may be performed on the selected image 102 to produce processed image 106 are described in more detail below. Although the description below refers to transmission of the processed image 106 to the printer 124 for printing, it should be appreciated that the selected image 102 may alternatively be transmitted to the printer 124 without any additional processing.

After extracting the selected image 102 and performing any processing to generate processed image 106, the image server 104 transmits the processed image 106 to the cell phone 116 over the Internet 112 and the data network 114 using appropriate WAP messages 108 (step 220). In one embodiment, image server 104 communicates with printer 124 using an image printing protocol designed to facilitate communication between image server 104 and printer 124 for purposes of performing functions such as downloading processed image 106 to the printer 124. Various embodiments of the image printing protocol are described in more detail below.

As described above, printer 124 monitors all messages (e.g., both WAP messages 108 and image protocol messages 110) received by cell phone 116 although, as described above, the printer 124 need not be connected to the data port 120 of the cell phone 116 prior to step 222. Printer 124 may perform this monitoring in any of a variety of ways. For example, in one embodiment of the present invention, the printer 124 is equipped with hardware and/or software that is capable of sending and receiving image protocol messages 110. The printer 124 may, for example, monitor the data port 120. While monitoring the data port 120, printer 124 may ignore WAP messages 108 and respond to messages that conform with the image printing protocol. Upon identifying such a conforming message, the printer 124 may respond accordingly. The printer 124 may send image protocol messages 110 to image server 104 by transmitting image protocol messages 110 to the data port 120.

These messages are forwarded by cell phone 116, through its antenna 118, to image server 104 over data network 114 and Internet 112.

For example, when the image server 104 transmits processed image 106 to the cell phone 116 using image protocol messages 110, such messages 110 are echoed at the data port 120 of the cell phone. Printer 124, which is monitoring the data port 120, recognizes that image protocol messages 110 contain processed image 106. Upon recognizing processed image 106 in this manner, printer 124 receives all image protocol messages 110 containing processed image 106 (step 222). Printer 124 then prints processed image 106 (step 224).

It should be appreciated that the techniques described above have a variety of advantages. For example, the user may select selected image 102 for printing, causing selected image 102 to be automatically downloaded to printer 124 and printed without disconnecting the cell phone 116 from the Internet 112 or changing the mode of operation of cell phone 116 from Internet mode. As a result, the user's web browsing experience is uninterrupted by the process of printing selected image 102. Furthermore, in one embodiment of the present invention, processed image 106 is downloaded to printer 124 without modifying the contents of the display of the cell phone 116. For example, the web page from which selected image 102 was selected may continue to be displayed while selected image 102 is being printed by printer 124. Furthermore, it is not required that cell phone 116 be connected to printer 124 through an intermediate computer, such as a conventional desktop or laptop computer. Although the cell phone 116 may be connected to printer 124 through such an intermediate computer, the ability to connect the cell phone 116 directly to the printer 124 increases the user's mobility when printing, particularly if the printer is a portable printer.

In a second aspect of the present invention, techniques are provided for enabling an image to be downloaded (e.g., over the Internet) from an image server through a cellular telephone operating in modem mode and printed without requiring the user to initiate a connection to the image server. More specifically, in one embodiment of the present invention, techniques are provided for:

1. enabling a user to identify, using a cellular telephone in Internet mode, an image stored on a web site (such as by using a web browser executing on the cellular telephone),
2. at a server associated with the web site:
   (a) receiving a "print" command from the user;
   (b) in response to receipt of the print command, transmitting the image to a printer through the cellular telephone in modem mode; and
3. printing the image.

After the user issues the "print" command, the user may disconnect the cell phone from the Internet, causing the cell phone to cease operating in Internet mode. The user may then connect the printer to the data port of the cell phone (if it is not already connected). The cell phone establishes a connection between the server and the printer over a voice network in data mode. This connection may be initiated by, for example, the server or the printer.

Figure 3:
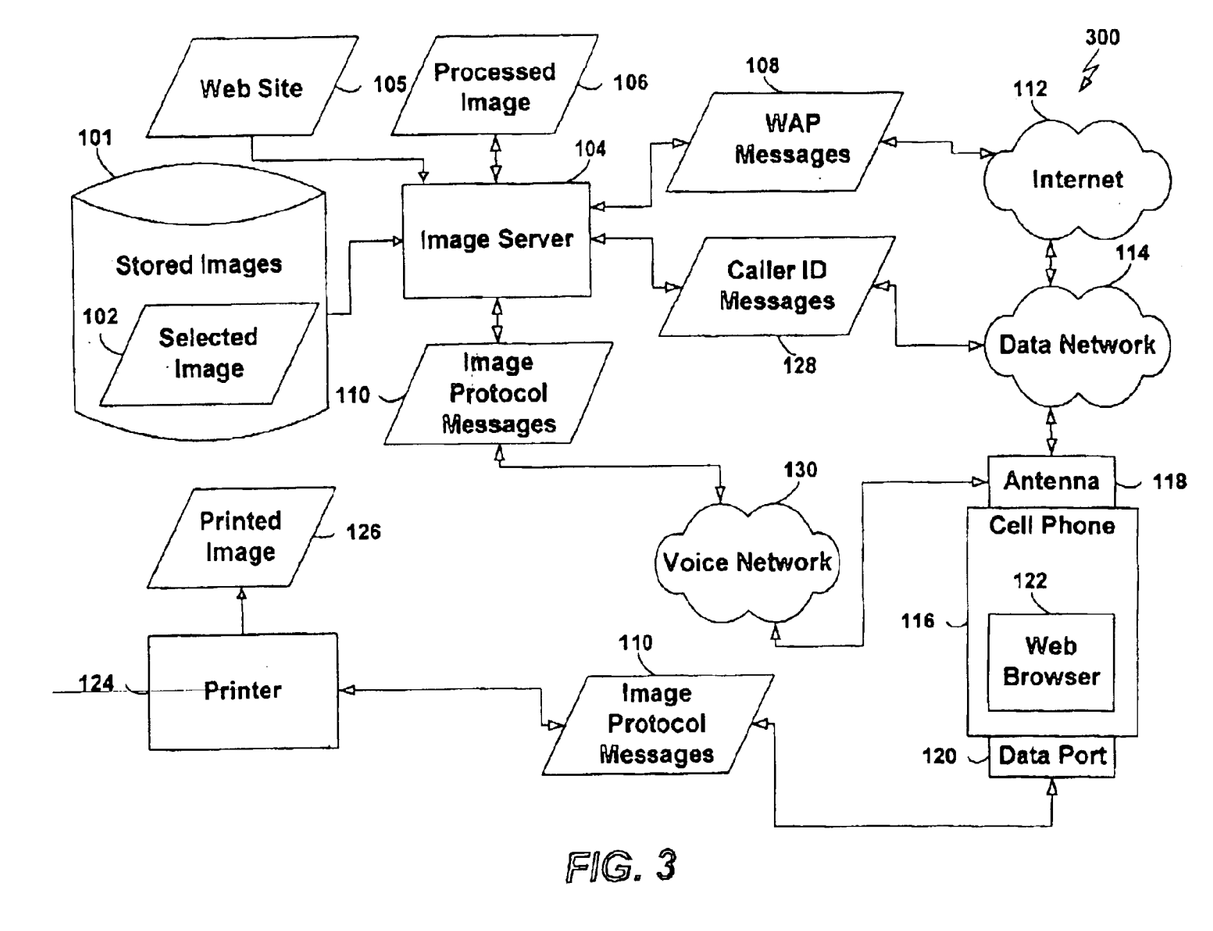
FIG. 3 is a block diagram of a system for downloading and printing an image from a web site using a cellular telephone while the cellular telephone is connected to the Internet in modem mode according to one embodiment of the present invention.

Referring to FIG. 3, various embodiments of this second aspect of the present invention will now be described in more detail. A system 300 shown in FIG. 3 may be used to print selected image 102 in accordance with the second aspect of the present invention. Referring to data flow diagram 400 of FIG. 4, an example of a method that may be used to download and print an image using the system 300 shown in FIG. 3 is now described. It should be appreciated that certain steps performed by this method are the same as or similar to steps 202–218 shown and described above with respect to FIGS. 2A–2B, and are therefore omitted from FIG. 4 for simplicity of illustration and explanation. It should therefore be assumed that step 402 (described in more detail below) may be performed after performing steps 202–218 or steps similar thereto.

Using system 300, a user of the cell phone 116 may connect to the Internet 112 in Internet mode as described above with respect to FIG. 1. Similarly, the user may select selected image 102 and issue a "print" command to indicate a desired to print selected image 102, as described above with respect to FIG. 1. It should be appreciated, however, that printer 124 need not be connected to data port 120 of cell phone 116 while the user browses the web, selects image 102, and issues the "print" command. Therefore, the user may remain fully mobile while engaging in these activities, without any limitations that may be imposed by the fixed location of printer 124.

Upon receiving the "print" command, image server 104 extracts selected image 102 and optionally processes it to generate processed image 106, as described above with respect to FIG. 1. In this embodiment, however, the user may disconnect the cell phone 116 from the Internet 112 after issuing the "print" command, thereby causing the cell phone 116 to cease operating in Internet mode.

A connection is then established between cell phone 116 and image server 104 over voice network 130. Voice network 130 is a wireless network that is typically used by cell phone 116 for voice calls and may, for example, be an analog network. During the existence of this connection to image server 104 over voice network 130, cell phone 116 operates in modem mode. In other words, cell phone 116 operates as a conduit between image server 104 and printer 124, transmitting messages between the image server 104 and printer 124 in a manner similar to a conventional modem.

The connection between cell phone 116 and image server 104 over voice network 130 may be initiated in any of a variety of ways. For example, in one embodiment of the present invention, upon disconnecting the cell phone 116 from the Internet 112, the user initiates the connection. For example, the user may connect the printer 124 to the data port 120 of the cell phone 116 (if it is not already connected) and press a "print" button on the printer 124. In this embodiment, printer 124 is designed to dial a telephone number associated with the image server 104 when the "print" button is pressed, thereby initiating a connection to the image server 104 through the cell phone 116.

Figure 4:
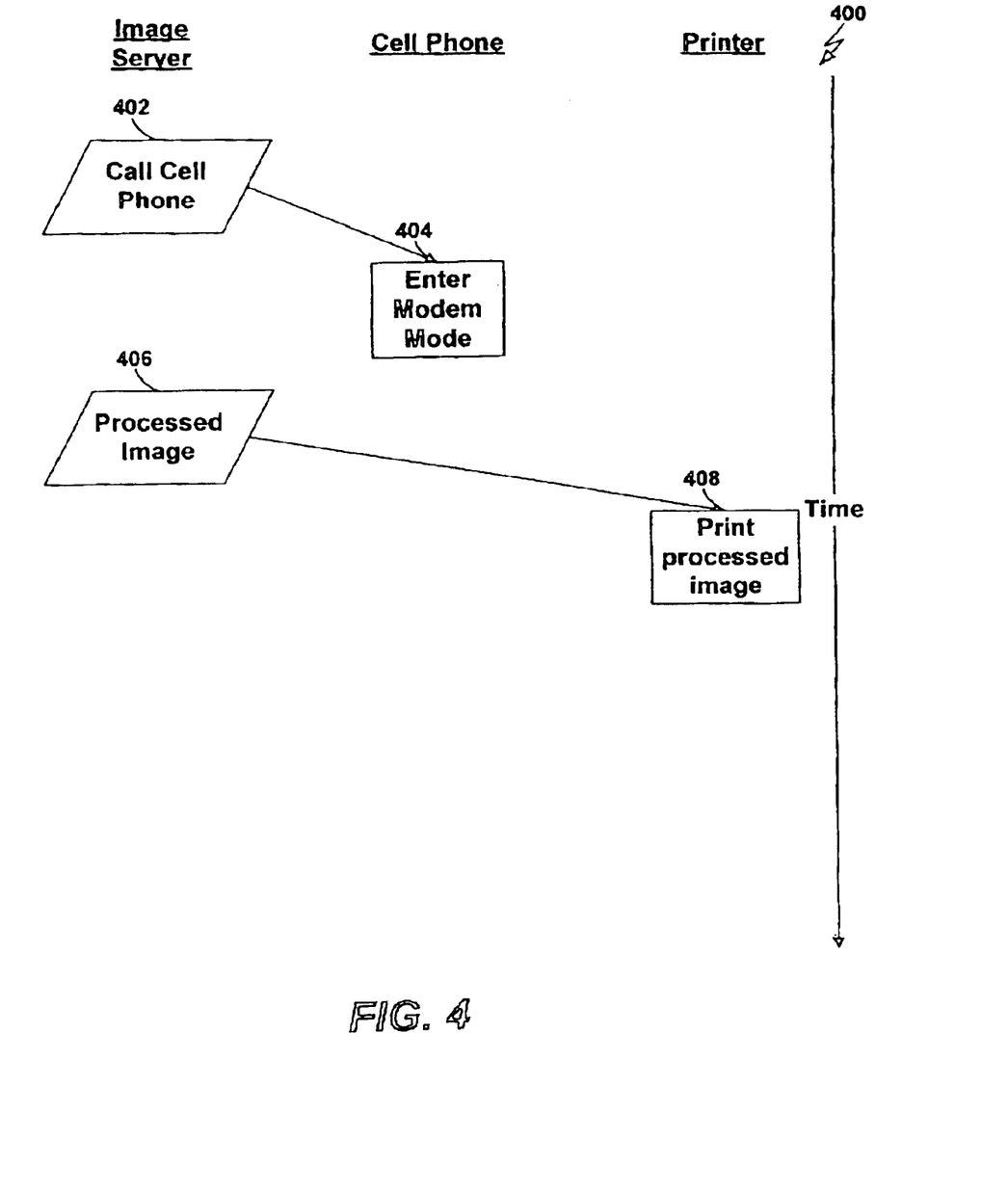
FIG. 4 is a data flow diagram of a process that is used by the system of FIG. 3 to print an image according to one embodiment of the present invention.

In another embodiment, upon receipt of the "print" command, the image server 104 initiates a connection to the cell phone 116 over voice network 130. For example, as described above, image server 104 may obtain the telephone number of the cell phone 116 using caller ID messages 128 at any time while the image server 104 is connected to the cell phone 116 over data network 114. The image server 104 may initiate a connection to cell phone 116 over voice network 130 by placing a telephone call to the cell phone (step 402), thereby placing the cell phone 116 in modem mode (step 404) and establishing a connection between the image server 104 and the printer 124. If the cell phone 116 is still operating in Internet mode when it receives the call from the image server 104 (if, for example, the user did not disconnect the cell phone 116 from the Internet 112 after issuing the "print" command), the cell phone 116 may automatically disconnect from the Internet 112 upon receiving the call from the image server 104.

Once a connection is established between the image server 104 and the cell phone 116 over the voice network 130, the image server 104 may transfer the processed image 106 to the printer 124 (step 406), which may then print printed image 126 (step 408). Image server 104 and printer 124 may communicate with each other over the voice network 130 using image protocol messages 110, as described above. Because the cell phone 116 is not operating in Internet mode, however, the image protocol messages 110 need not be defined to be free of interference with WAP messages 108. In this embodiment, therefore, the image printing protocol that defines image protocol messages 110 may be defined in any manner without interfering with the operation of cell phone 116.

In a third aspect of the present invention, techniques are provided for enabling an image to be downloaded through a cellular telephone and printed without requiring the cellular telephone to access the Internet. As a result, cellular telephones without Internet capabilities may be used in accordance with various embodiments of this third aspect of the present invention.

Figure 5:
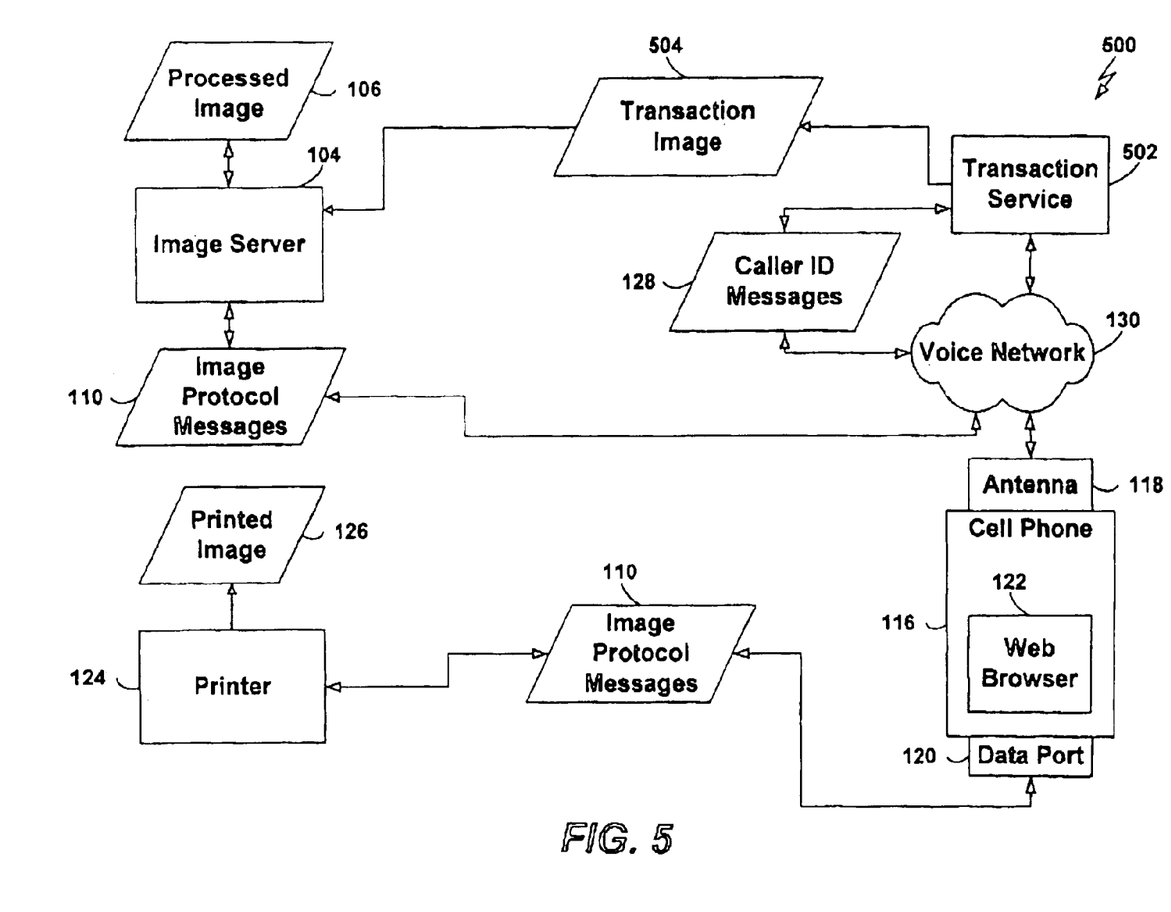
FIG. 5 is a block diagram of a system for downloading and printing an image using a cellular telephone while the cellular telephone is operating in modem mode to connect an image server to a printer according to one embodiment of the present invention.

Referring to FIG. 5, various embodiments of this third aspect of the present invention will now be described in more detail. A system 500 shown in FIG. 5 may be used to print a transaction image 504 associated with a transaction in accordance with the third aspect of the present invention. Referring to data flow diagram 600 of FIG. 6, an example of a method that may be used to download and print an image using the system 500 shown in FIG. 5 is now described.

Figure 6:
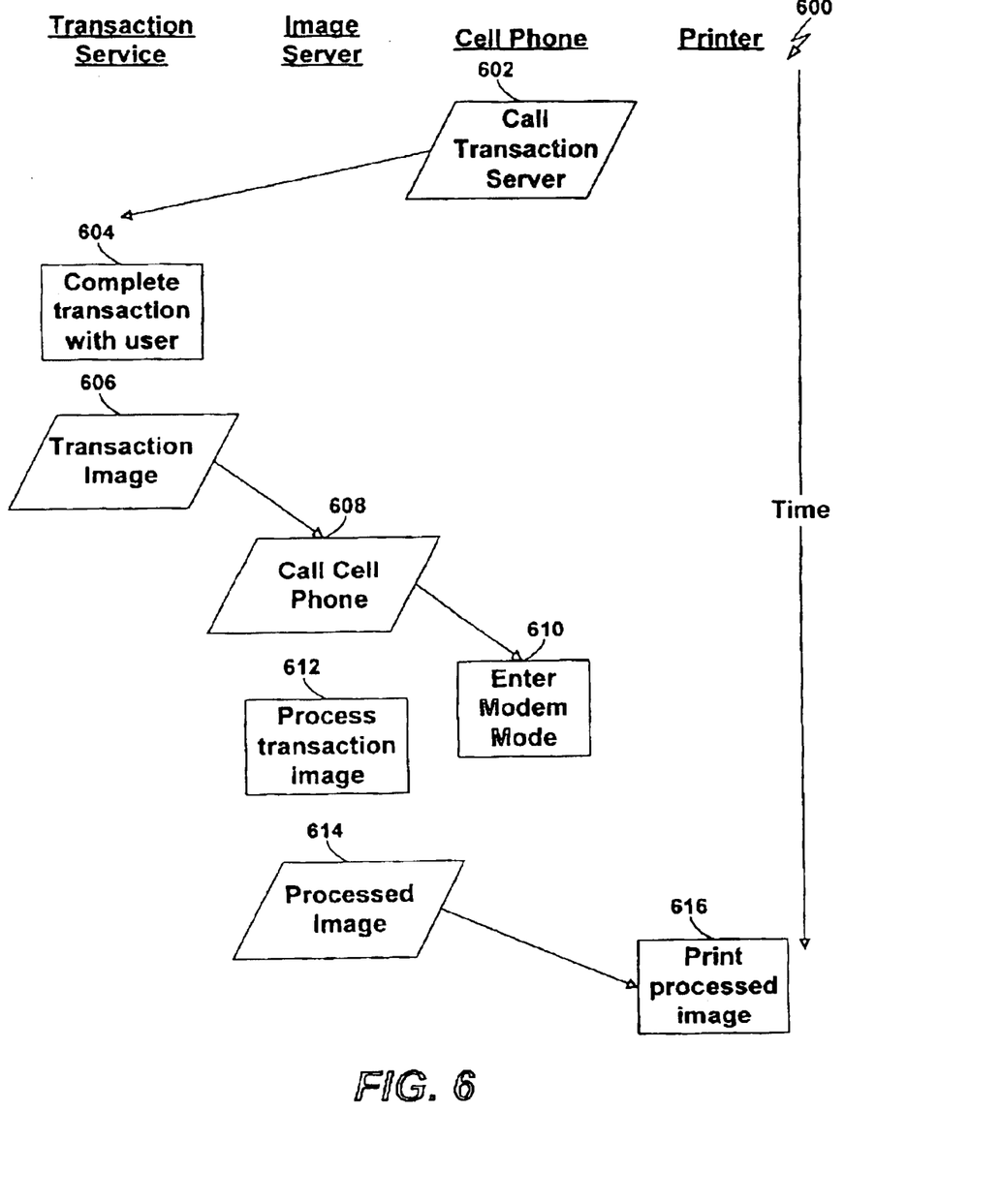
FIG. 6 is a data flow diagram of a process that is used by the system of FIG. 5 to print an image according to one embodiment of the present invention.

In particular, a user of the cell phone 116 may place a voice telephone call to a transaction service 502 over voice network 130 using cell phone 116 (step 602). During this call the cell phone 116 operates in voice mode. Transaction service 502 may be any transaction service, such as a service for purchasing event tickets or a service for requesting and/or purchasing information, such as maps, brochures, coupons, photographs, menus, or schedules. The user completes a transaction (such as purchasing a ticket) with transaction service 502 using a user interface provided by the transaction service 502 (step 604).

Upon completion of the transaction, transaction service 502 transmits a transaction image 504 to image server 104 (step 606). Transaction image 504 may be any image associated with the transaction, such as an image of the ticket purchased by the user. Transaction service 502 may transmit transaction image 504 to image server 104 over any network (such as the Internet) and using any protocol. Transaction service 502 may also transmit other information about the transaction (not shown) to the image server 104 to enable the image server 104 to identify the cell phone 116 and/or the user of the cell phone 116. For example, the transaction service 502 may transmit the telephone number of the cell phone 116, as obtained using caller ID messages 128. It should be appreciated that printer 124 need not be connected to data port 120 of cell phone 116 while the user completes the transaction with transaction service 502.

After completing the transaction with transaction service 502, the user connects printer 124 to data port 120 of cell phone 116 (if it is not already connected). A connection between cell phone 116 and image server 104 is then initiated, with the cell phone 116 in modem mode. This connection may be initiated in any of a variety of ways, as described above with respect to FIG. 3. For example, the image server 104 may call the cell phone 116 (step 608), establishing a connection with the cell phone over voice network 130 and causing the cell phone 116 to enter the modem mode of operation (step 610).

The image server 104 may process the transaction image 504 to produce processed image 106 (step 612). The image server 104 may process transaction image 504 in any of a variety of ways, as described above with respect to processing of the selected image 102 in FIG. 1. The image server 104 may identify features of the printer 124 in any of a variety of ways, such as by querying the printer 124 for such features using image protocol messages 110 (as described above with respect to FIG. 1), or by looking up the features in the user's account based on the telephone number of the cell phone 116, as provided to the image server 104 by the transaction service 502.

Upon initiation of the connection between the image server 104 and the printer 124 with the cell phone 116 operating in modem mode, image server 104 transfers the processed image 106 to the printer 124 (step 614), which may then print printed image 126 (step 616). Image server 104 and printer 124 may communicate with each other over the voice network 130 using image protocol messages 110, as described above.

As described above with respect to FIG. 5, in one embodiment of the present invention, the image server 104 may be used by the transaction service 502 for the image processing and printing capabilities provided by the image server 104. The particular example illustrated in FIG. 5 is only one example of a manner in which the image server 104 may be used, and does not constitute a limitation of the present invention. More generally, capabilities of the image server 104—such as the ability to produce processed image 106 in accordance with particular capabilities of the printer 124 and the ability to transmit processed image 106 to printer 124 for printing over the data network 114 or the voice network 130—may be used by other services in a variety of ways.

Figure 7:
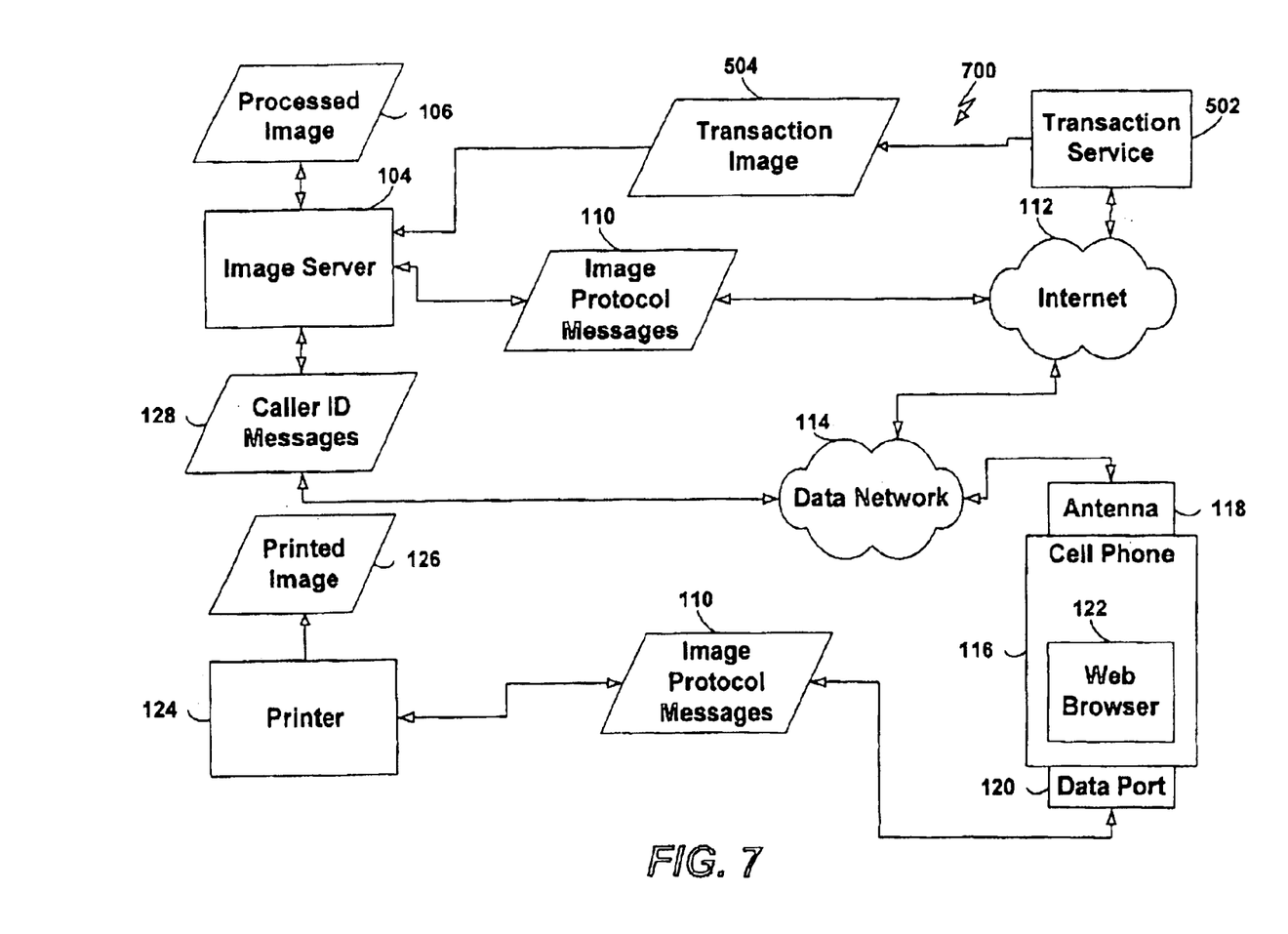
FIG. 7 is a block diagram of a system for downloading and printing an image associated with a transaction using a cell phone operating in Internet mode according to one embodiment of the present invention.

For example, referring to FIG. 7, a block diagram is shown of a system for downloading and printing an image associated with a transaction using a cell phone operating in Internet mode according to one embodiment of the present. A user connects to the transaction service 502 over the Internet 112 using the cell phone 116 in Internet mode. The user completes a transaction with the transaction service 502 using a web site (not shown) provided by transaction service 502, causing transaction service 502 to transmit transaction image 504 to image server 104 as described above with respect to FIG. 5. Image server 104 processes transaction image 504 to produce processed image 106 as described above with respect to FIG. 5.

The processed image 106 may be printed in any of a variety of ways. For example, image server 104 may transmit processed image 106 to printer 124 for printing using any of the techniques described herein. Alternatively, the image server 104 may transmit the processed image 106 back to the transaction server 502, which may transmit the processed image 106 over the Internet 112 and data network 114 to printer 124, which may print processed image 106 as printed image 126. The transaction server 502 may communicate with printer 124 using the image printing protocol described above, thereby enabling processed image 106 to be printed without interfering with the operation of cell phone 116 and without causing cell phone 116 to cease operating in Internet mode. As a result, the user may interact solely with the user interface provided by the transaction service's web site, and the capabilities (e.g., generation of the processed image 106) provided by the image server 104 may be provided transparently, without any interaction by or knowledge of the user. The image server 104 may therefore act as an application service that is used by the transaction server 502 to produce processed image 106 in a format that is suitable for printing by printer 124.

As mentioned above, image server 104 may process the selected image 102 (or transaction image 504) to generate processed image 106. In general, references herein to processing of the selected image 102 also apply to processing of the transaction image 504. The processing used by the image server 104 to produce processed image 106 may take any of a variety of forms. For example, in one embodiment, image server 104 compresses selected image 102 so that processed image 106 may be transmitted more quickly to cell phone 116.

In another embodiment, image server 104 modifies selected image 102 based on capabilities of the printer 124. For example, image server 104 may modify selected image 102 by changing its spatial resolution or color depth. For example, image server 104 may convert selected image 102 to a 2-bit (black-and-white) image if printer 124 is only capable of printing in black and white. Similarly, image server 104 may convert selected image 102 to an image having a spatial resolution of 1200 dots per inch (dpi) if printer 124 is capable of printing images having such a spatial resolution. Image server 102 may also modify selected image 102 in any of a variety of other ways to tailor processed image 106 more specifically to the capabilities of printer 124.

Image server 104 may obtain knowledge of the capabilities of the printer 124 in any of a variety of ways. For example, printer 124 may provide such information to image server 104 over the Internet 112, the data network 114, or the voice network 130, or any combination thereof. For example, the printer 124 may transmit such information to image server 104 using image protocol messages 110 defined according to the image printing protocol described generally above, a particular embodiment of which is described in more detail below. It should be appreciated that the printer 124 may transmit a limited amount of information about its capabilities, such as its manufacturer and model number, to the image server 104, and that the image server 104 may infer therefrom additional information about the printer 124. For example, image server 104 may maintain a database of printer capabilities for a variety of printer manufacturers and models. In response to receiving the manufacturer and model information from printer 124, image server 104 may obtain additional information about printer 124 (such as the spatial resolutions and color depths at which it is capable of printing) from the database.

Printer 124 may transmit information descriptive of its capabilities at any time. For example, in one embodiment of the present invention, image server 104 transmits a request for printer capability information to the printer 124 in response to the user's selection of selected image 102. In response to receipt of this request for information, printer 124 transmits the requested information to image server 104. Image server 104 may use such information to generate processed image 106 from selected image 102. Image server 104 may store the printer capability information for an additional period of time, such as the duration of the user's web browsing session, so that the image server 104 need not request the printer capability information each time the user selects an image to be printed.

In various embodiments of the invention described above, image server 104 communicates with printer 124 using image protocol messages 110 defined according to an image printing protocol. The image printing protocol may take any of a variety of forms.

For example, if the image server 104 and printer 124 communicate with each other while the cell phone 116 is operating in Internet mode (such as in the embodiment depicted in FIG. 1), the image printing protocol may define messages that are designed not to interfere with WAP messages 108 used by the cell phone 116 to communicate over the Internet 112. For example, all messages defined according to the image printing protocol may include a sequence of characters—such as ten consecutive nulls—that do not constitute a WAP-compliant message. As a result, any such message sent by the image server 104 or the printer 124 through cell phone 116 will be ignored by the cell phone 116 (which only understands and responds to WAP-compliant messages), and will therefore not interfere with the normal operation of the cell phone 116. For example, transmission of such messages through the cell phone 116 in either direction will not cause spurious characters or other graphics to be displayed on the cell phone's display. When the cell phone 116 receives such a message through its antenna 118, the message will be echoed at the cell phone's data port 120, where it can be received by the printer 124. Conversely, when such a message is transmitted by printer 124 to the cell phone's data port 120, the message will be transmitted by the cell phone 116 through its antenna 118. In this manner, the image server 104 and printer 124 may use the cell phone 116 as a communications device for transmitting and receiving image protocol messages 110 while the cell phone 116 is in Internet mode without interfering with the operation of the cell phone.

It should be appreciated that that if the cell phone 116 is operating in modem mode, image protocol messages 110 need not be defined to be free of interference with WAP messages 108, since the cell phone 116 acts merely as a passive conduit of information while operating modem mode and does not attempt to interpret messages transmitted through it.

The image printing protocol may define any of a variety of messages for enabling communication between the image server 104 and the printer 124. For example, in one embodiment, the image printing protocol defines messages including the following:

1. INIT. This message is transmitted from the image server 104 to the printer 124 to notify the printer 124 that the image server 104 is requesting the initiation of communication between the image server 104 and printer 124. The image server 104 may, for example, transmit this message in response to receipt of the "print" command from the user (e.g., after step 214 in FIG. 2).

2. REQUEST_SPECS. This message is transmitted from the image server 104 to the printer 124 to request information about the printer 124. The manner in which this information may be used is described in more detail above.

3. TRANSMIT_SPECS. This message is transmitted from the printer 124 to the image server 104, in response to the REQUEST_SPECS message. Included in the message are the specifications requested by the server. A REQUEST_SPECS message and corresponding TRANSMIT_SPECS message may be transmitted, for example, between steps 216 and 218 in FIG. 2.

4. TRANSMIT_IMAGE. This message is transmitted from the image server 104 to the printer 124 after the image server 104 receives the requested printer specifications. The message includes the process image 106 to be printed. The TRANSMIT_IMAGE message may, for example, be used to implement step 220 in FIG. 2.

5. END. This message is transmitted from the image server 104 to the printer 124 at the conclusion of transmission of the processed image 106 to the printer 124 (e.g., after step 222 in FIG. 2). After receipt of the END command from the image server 104, the printer 124 may print the processed image 106 (step 224 in FIG. 2).

It should be appreciated that messages 110 defined by the image printing protocol (such as the examples provided in the list above) may be encoded in any manner. For example, as described above, in one embodiment, each of the messages defined by the image printing protocol may be a unique sequence of characters that does not define a message according to WAP. Defining image protocol messages 110 in this manner enables the image server 104 and printer 124 to communicate with each other without interfering with the operation of the cell phone 116 in Internet mode.

It should be appreciated that particular implementations of the image printing protocol may involve additional messages not shown here but which will be apparent to those of ordinary skill in the art. For example, messages transmitted by the image server 104 (such as the INIT command) may have corresponding acknowledgement (ACK) messages which are transmitted in response by the printer 124 as a method of handshaking. As another example, the TRANSMIT_IMAGE message may be transmitted from the image server 104 to the printer 124 as a plurality of messages, each of which contains a portion of the processed image 106. The image printing protocol may also include provisions for error detection and/or correction. Such implementation details of particular embodiments of the image printing protocol are not described here for simplicity of explanation and will be apparent to those of ordinary skill in the art.

Various aspects and embodiments of the present invention have various advantages, which include but are not limited to the following.

As described above, in one aspect of the present invention techniques are provided for enabling an image to be downloaded over the Internet through a cellular telephone and printed while the cellular telephone is operating in Internet mode. For example, the user may connect to the Internet using the cell phone in Internet mode, browse to a web site using the cell phone's web browser, and select an image on the web site using the cell phone's web browser. The user may then simply issue a "print" command to the web site's web server, causing the selected image to be automatically downloaded and printed without disconnecting the cell phone from the Internet. The ability to print an image without disconnecting the cell phone from the Internet advantageously maintains the continuity of the user's browsing experience.

This provides a simplified method for printing images, compared to the conventional technique described above in which the user who desires to print an image identified on the Web using a cell phone operating in Internet mode must disconnect the cell phone from the Internet, connect a computer to the cell phone, manually initiate a new connection to the Internet through the cell phone in modem mode, navigate to the web site containing the identified image, and print the image from the computer's web browser. This prior art technique requires a significant amount of activity on the part of the user, including the requirement that the user remember the precise Internet address of the image to be printed. In contrast, the embodiment of the invention described above automates the process of printing images from the Web and decreases the amount of time needed to print such images.

As described above, in another aspect of the present invention, an image server may initiate a call to a cell phone in modem mode in response to receipt of the "print" command from the user. Although this technique may cause the cell phone's Internet mode connection to the Internet to terminate, it still retains the advantages of automating the process of downloading and printing of the selected image, and the advantage of freeing the user from the need to recall and manually re-navigate to the Internet address of the desired image in order to print it.

As further described above, in one embodiment of the present invention, the server may tailor the selected image based on the capabilities of the printer. This feature has a variety of advantages. For example, the image may be printed at high resolution on a printer capable of printing at high resolution and at low resolution on a printer only capable of printing at low resolution. As another example, the image server may shrink the image when printing to a small, mobile printer. More generally, the image server may use the known capabilities of the printer to tailor the image in such a manner that it is rendered optimally by the printer. The ability of the image server to tailor the image to the specifications of the printer also makes the quality and features of the printed image independent of the (typically limited) quality and features of the cell phone's display. For example, the image server may provide a full-page, color, high-resolution image for printing on a full-featured printer even though the display of the cell phone is only capable of displaying small, low-resolution, black-and-white images.

Furthermore, as described above, in various embodiments of the present invention, a cell phone may be connected directly to a printer, which may download images over a network (such as the Internet) and print the downloaded images. The ability to use a cell phone in conjunction with a printer to download and print images without the use of a computer (such as a desktop or laptop computer) increases the mobility of the user when printing images, particularly if the printer is a portable printer.

A further advantage of various embodiments of the present invention described above is that most of the processing involved is performed by the image server, rather than the cell phone or the printer. For example, any preprocessing of the image (such as color transformation, compression, etc.) may be performed by the image server. The image server typically has much greater computational and storage resources than the cell phone or printer, and is therefore more suitable for performing such tasks. A related advantage is that the image is typically stored and processed locally to the server before compressing the image. Since the processed image is therefore typically smaller than the original image, less bandwidth is used to transmit the processed image to the printer than if the original image were transmitted to the cell phone or printer for processing. This decreases the amount of time needed to transmit the image from the server to the printer. This is a particular advantage given the relatively low bandwidth of most current wireless networks.

Furthermore, since the functions related to printing are performed by the server and the printer, the cell phone need not be equipped with any significant processing capabilities. For example, in embodiments in which the server and printer communicate through the cell phone while the cell phone operates in Internet mode, the cell phone may simply be equipped with the ability to echo Internet communications to the printer through the cell phone's data port. In embodiments in which the server and printer communicate through the cell phone while the cell phone operates in modem mode, the cell phone need only be capable of operating as a modem. As a result, conventional cellular telephones may be used in conjunction with various embodiments of the present invention with few, if any, modifications.

Similarly, in various embodiments of the present invention, conventional printers may be used as the printer 124 with minimal modifications. For example, a conventional printer may be modified to support (using software and/or hardware) the image printing protocol described herein. Since implementation of this protocol may only involve performance of simple actions such as polling the Internet connection for the initiation of an image transmission and downloading an image, the printer may be enabled to support the image printing protocol with a minimum of hardware and/or software.

Additional aspects and embodiments of the present invention will be described in more detailed below.

It should be appreciated that the various embodiments described above are provided merely for purposes of example and do not constitute limitations of the present invention. Rather, various other embodiments are also within the scope of the claims, such as the following. The cell phone 116 may be any mobile and/or portable device capable of conducting wireless communications, such as a personal digital assistant (PDA). The cell phone 116 and printer 124 could be combined into a single mobile device capable of conducting wireless communication and printing digital images. Caller ID messages 128 may be transmitted over the data network 114, the voice network 130, or a combination thereof. The data network 114 and voice network 130 may not be entirely wireless. Rather, the term "wireless" herein refers to the use of wireless communications by the cell phone 116 through its antenna 118.

Although server 104 is described herein as an "image server," it should be appreciated that more generally the server 104 is a printing server that may serve any kind of information—referred to herein as "printing information"—suitable for transmission to the printer 124. Similarly, stored images 101 may contain information other than images, and selected image 102 and processed image 106 may be information other than images. As used herein, the term "printing information" refers to information including but not limited to images, text, video, web pages, and any combination thereof. The printer 124 may further process the printing information that it receives (such as processed image 106) to produce printed image 126.

The Internet 112 is provided merely as an example of a network with which various embodiments of the present invention may be used. Various other networks, however, may also be employed instead of or in addition to the Internet 112. For example, an internet other than the public Internet 112 may be used. Alternatively, communications described herein as occurring over both the Internet 112 and the data network 114 may, for example, occur solely over the data network 114.

Furthermore, the term "connection" as used herein (e.g., a connection between cell phone 116 and image server 104) refers to any kind of connection that enables communication between or among two or more devices. For example, a "connection" may be a physical and/or logical connection enabled by any combination of wired and/or wireless networks. For example, the term "connection" refers to connections established over the data network 114, voice network 130, and the Internet 112, and combinations thereof.

It should be appreciated that the printer 124 may be connected to data port 120 of cell phone 116 in any of a variety of ways. For example, a data cable may be coupled between a data port on the printer 124 and data port 120 of cell phone 116. Any form of data communications may be used to communicate between printer 124 and data port 120, including but not limited to wireless communications means such as BlueTooth and Infrared Data Association (IrDA). It should be appreciated that a "coupling" between the printer 124 and data port 120 refers generally to any means for enabling communication between printer 124 and data port 120.

The printer 124 is described herein as performing various functions, such as communicating in accordance with the image printing protocol and printing the printed image 126, in accordance with various embodiments of the present invention. It should be appreciated that such functionality may be implemented within the printer 124 in any manner, such as by using hardware, software, firmware, or any combination thereof. In general, a printer "controller" refers herein generally to any such subsystem(s) of the printer 124 that perform the functions described herein.

Although the cell phone 116 is described in the examples above as performing the functions of a passive conduit of information between the image server 104 and the printer 124, the cell phone 116 may perform additional functions. For example, the cell phone 116 may perform some of the functions associated with sending, receiving, and/or interpreting the image protocol messages 110. For example, the cell phone 116 may be a Java-enabled cell phone on which a Java application or applet executes which is capable of interpreting image protocol messages 110. Such software may, for example, perform some of the handshaking associated with the image printing protocol described above. The cell phone 116 may also perform other functions that are described as being performed by the image server 104, the printer 124, or other components above.

Although examples are provided above in which images are printed in response to actions performed by the user, this is not a limitation of the present invention. Rather, images may be automatically printed without any prompting by the user. For example, a coupon or advertisement may be automatically printed when a user navigates to a particular web site, without the initiation of any particular action by the user at that web site.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

What is claimed:

1. A method comprising steps of:
   (A) in response to completion of a transaction by a user with a transaction service over a first wireless network using a mobile communications device, transmitting printing information over a second wireless network wherein the mobile communications device has a first mode of operation in which the mobile communications device operates as a wireless telephone and a second mode of operation in which the mobile communication device operates as a modem and wherein the user completes the transaction while the mobile communications device is operating in the first mode of operation, and
   (B) placing a telephone call to the mobile communication device to establish a connection to mobile communication device and to place the mobile communication device in the second mode of operation in preparation for receiving printing information transmitted over the second wireless network and, while the mobile communication device is operating in the second mode of operation, receiving the printing information from a port of the mobile communications device; and
   (C) printing the printing information.

2. The method of claim 1, wherein the step (A) comprises steps of:
   (A)(1) at a printing server, transmitting the printing information to the transaction service; and
   (A)(2) transmitting the printing information to the mobile communications device.

3. The method of claim 1, wherein the step (A) comprises a step of:
   (A)(1) at a printing server, transmitting the printing information to the mobile communications device.

4. The method of claim 2, wherein the placing of a telephone call to the mobile communication device in step (B) is performed by the printing server.

5. The method of claim 2, wherein the placing of a telephone call to the mobile communication device in step (B) is performed by the transaction service.

6. A system for printing remote digital images from the Internet using a mobile wireless communication device and a printer, the system comprising:
   a server on the Internet, accessible via a wireless communications network, operable to provide web site information, including web based digital images, and image printing information for such images selected by a user for down loading; the web site information and the image printing information having different protocols allowing the web site and image printing information to be transmitted and received together without interfering with each other;
   a mobile wireless communication device being operable in user selected modes including a voice mode for voice communications and an Internet mode for accessing the Internet server to obtain web site and image printing information, the mobile wireless communication device being operable by the user in the Internet mode to access web sites, select an image on a web site and send a PRINT command to the server to initiate downloading of image printing information together with current web site information, the mobile wireless communication device also including a port which echoes both web site and image printing information; and
   a printer for printing a selected image in accordance with its image printing information, said printer including a controller having a printer port connected to the port of the mobile wireless communication device, the controller being configured to monitor and receive image printing information from the mobile wireless communication device which continues to operate in its Internet mode;
   whereby such continued operation in the Internet mode allows the user to access web sites without interruption during image printing operations by the printer.

7. The system of claim 6 wherein the server including means for processing a selected image so that its image printing information is compatible with characteristics of the printer, and the printer includes means for sending printer characteristic to the server though the mobile wireless communication device upon receive a request for such characteristics information from the server.

8. A method for printing remote digital images from the Internet using a mobile wireless communication device and a printer, the system comprising the steps of:
   providing a server on the Internet, accessible via a wireless communications network, being operable to provide web site information, including web based digital images, and image printing information for such images selected by a user for down loading; the web site information and the image printing information having different protocols allowing the web site and image printing information to be transmitted and received together without interfering with each other;

providing a mobile wireless communication device being operable in user selected modes including a voice mode for voice communications and an Internet mode for accessing the Internet server to obtain web site and image printing information, the mobile wireless communication device being operable by the user in the Internet mode to access web sites, select an image on a web site and send a PRINT command to the server to initiate downloading of image printing information together with current web site information, the mobile wireless communication device also including a port which echoes both web site and image printing information; and providing a printer for printing a selected image in accordance with its image printing information, said printer including a controller having a printer port connected to the port of the mobile wireless communication device, the controller being configured to monitor and receive image printing information from the mobile wireless communication device which continues to operate in its Internet mode;

whereby such continued operation in the Internet mode allows the user to access web sites without interruption during image printing operations by the printer.

9. The method of claim 8 wherein the server including means for processing a selected image so that its image printing information is compatible with characteristics of the printer, and the printer includes means for sending printer characteristic to the server though the mobile wireless communication device upon receive a request for such characteristics information from the server.

* * * * *